Dec. 8, 1953    R. MARKLEY    2,661,607
MILK COOLER

Filed Feb. 14, 1950    4 Sheets-Sheet 1

Inventor
Richard Markley

By *Clarence A. O'Brien and Harvey B. Jacobson*
Attorneys

Inventor
Richard Markley

Dec. 8, 1953 R. MARKLEY 2,661,607
MILK COOLER
Filed Feb. 14, 1950 4 Sheets-Sheet 3

Inventor
Richard Markley
By *Clarence A. O'Brien and Harvey B. Jacobson*
Attorneys

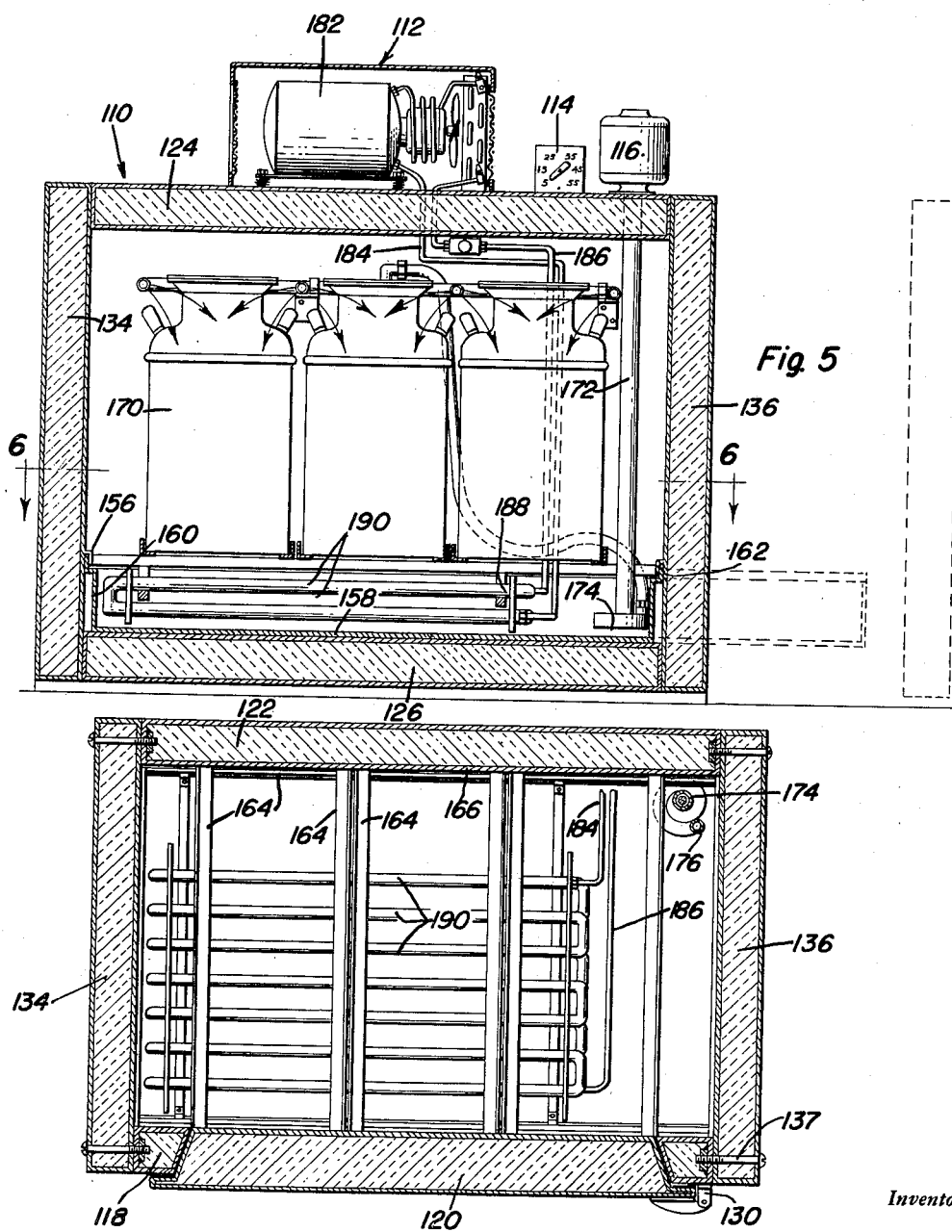

Patented Dec. 8, 1953

2,661,607

UNITED STATES PATENT OFFICE 2,661,607

MILK COOLER

Richard Markley, Madison, Wis., assignor to Dairy Equipment Company, Madison, Wis.

Application February 14, 1950, Serial No. 144,069

9 Claims. (Cl. 62—141)

This invention comprises novel and useful improvements in an improved milk cooler and more specifically pertains to an improved construction of refrigerating cabinet for conveniently and efficaciously storing cans of milk and for maintaining the same in a hygienic and refrigerated condition during storage.

The principal object of this invention is to provide an improved construction of refrigerating cabinet in which cans of milk may be stored in an improved manner and in which the depositing of cans of milk within said cabinet and the removal of the cans therefrom may be facilitated and effected in a more convenient and advantageous manner.

A further object of the invention is to provide an improved storage cabinet of standard or uniform units which may be easily enlarged with a minimum effort and in an economical manner to increase the storage capacity of the same.

A still further object of the invention is to provide an improved milk storage cabinet in conformity with the preceding object wherein a plurality of standardized cabinet units may be selectively attached and assembled together to provide an improved milk storage cabinet of various desired capacities.

A further important object of the invention is to provide an improved milk storage cabinet having improved means for maintaining cans of milk therein at any desired temperature and by an improved refrigerating system.

Yet another important object of the invention is to provide an improved milk storage cabinet in accordance with the preceding objects, which shall be so constructed that any moisture or spray within the cabinet will be collected into a convenient drain tank together with improved sealing means for preventing the moisture or spray from contacting undesired portions of the cabinet.

These, together with the various ancillary features and objects of the invention which will later become apparent as the following description proceeds, are attained by the present invention, the preferred embodiments of which have been illustrated, by way of example only, in the accompanying drawings, wherein:

Figure 5 is a vertical central longitudinal sectional view through the embodiment of Figure 4;

Figure 6 is a horizontal sectional detail view taken substantially upon the plane indicated by the section line 6—6 of Figure 5;

Reference is now made more specifically to the accompanying drawings, wherein like numerals designate similar parts throughout the various views, attention being first directed to the preferred construction or embodiment of the principles of the invention as disclosed in Figures 1–3 and 8.

Figure 1:
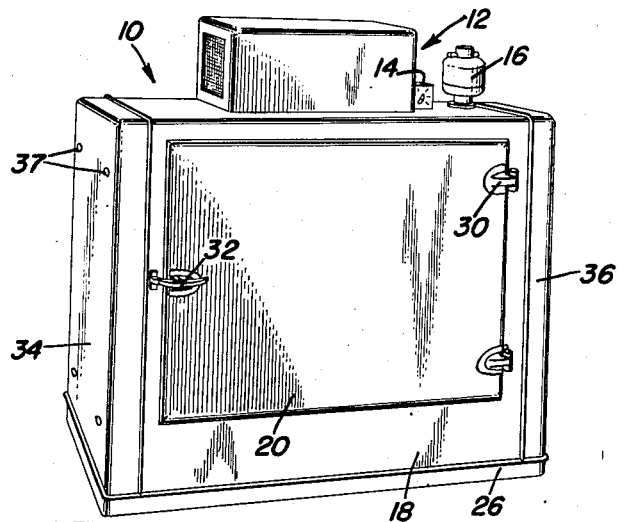
Figure 1 is a perspective view from the front of a preferred embodiment of the improved cabinet constructed in accordance with the principles of this invention.
Figure 2:
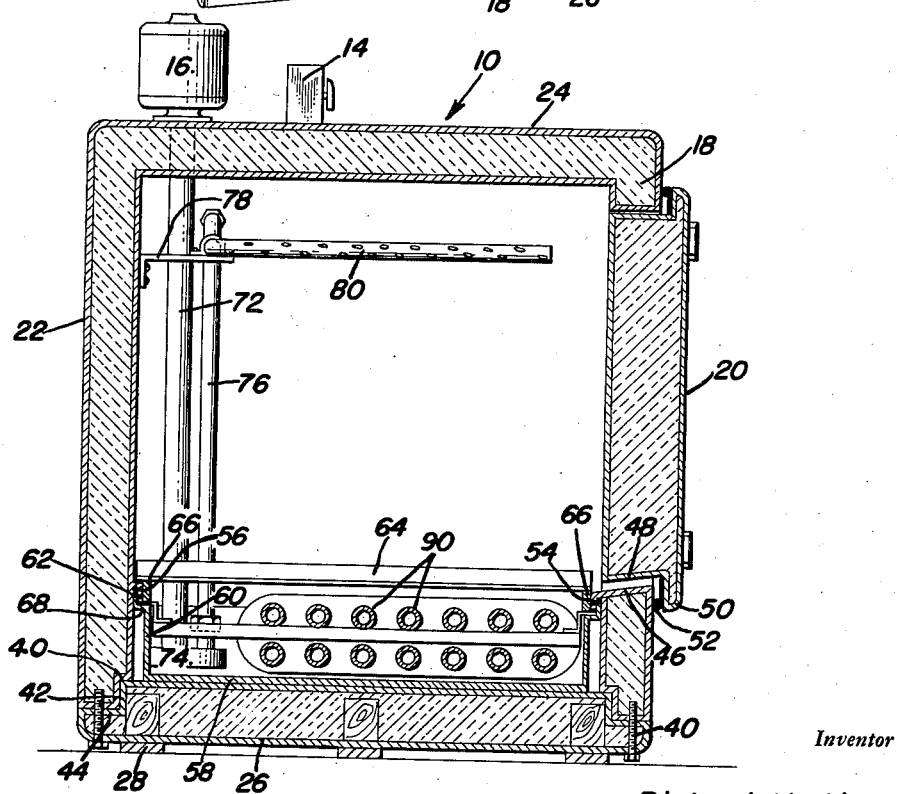
Figure 2 is a vertical central transverse sectional view through the cabinet of Figure 1.
Figure 3:
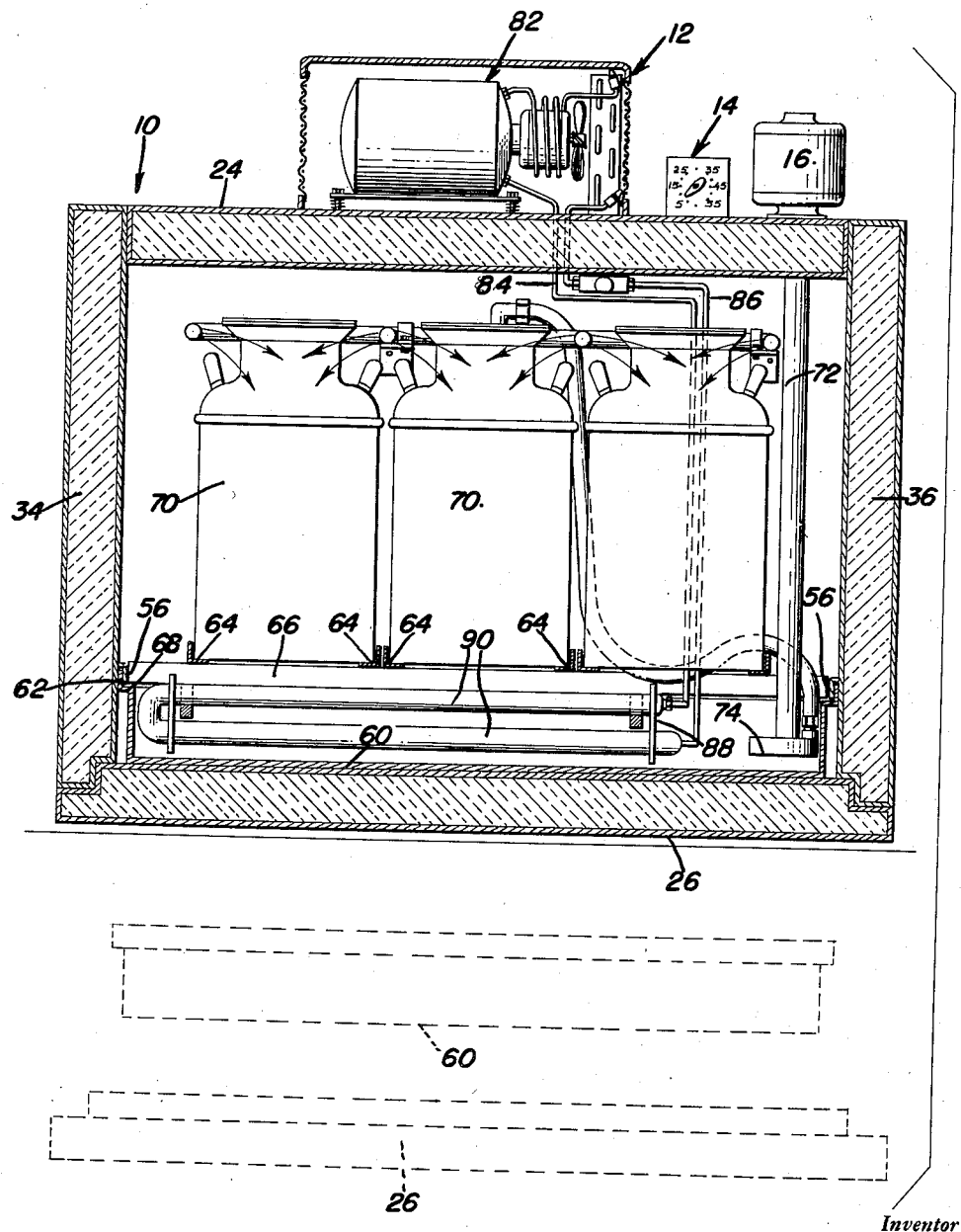
Figure 3 is a vertical central longitudinal sectional view through the cabinet of Figure 1.
Figure 4:
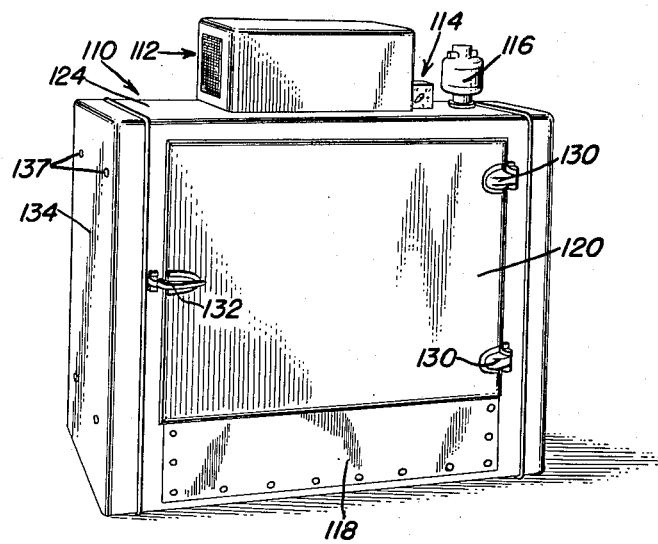
Figure 4 is a perspective view from the front of a second embodiment of the improved cabinet embodying the principles of this invention.
Figure 7:
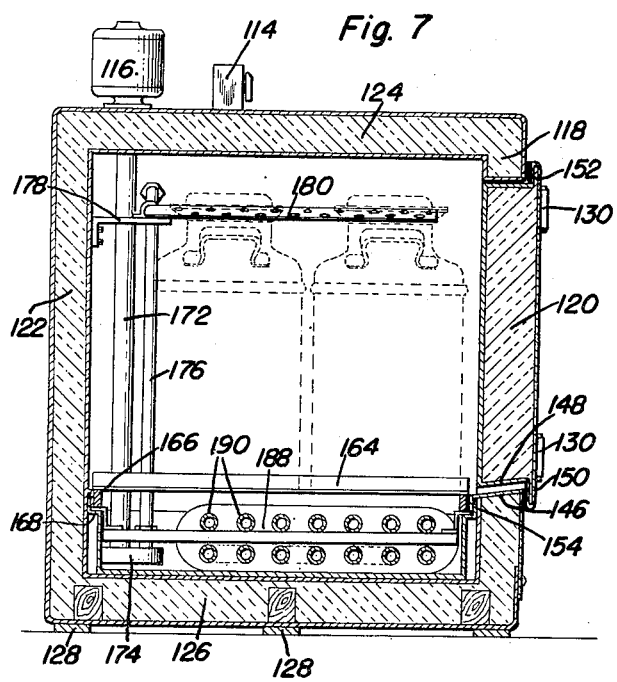
Figure 7 is a vertical transverse sectional view through the embodiment of Figure 4.
Figure 8:
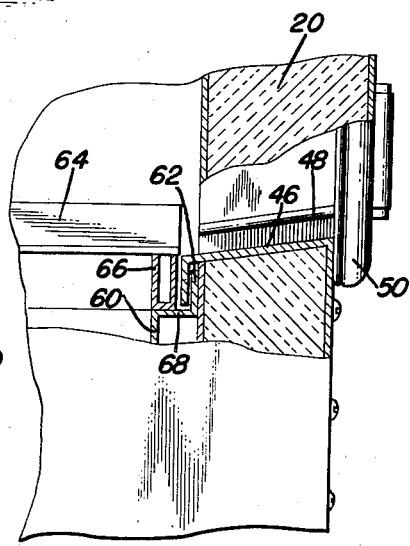
Figure 8 is an enlarged detail view of a portion of the cabinets shown in Figures 1 and 4.

The numeral 10 indicates generally the refrigerator cabinet of Figures 1–3 in accordance with the concept of this invention. This cabinet is provided with and supports a motor compressor refrigerator unit indicated generally by the numeral 12 and a time clock 14 for controlling the operation of a coolant circulating motor 16, all of these elements being conveniently and accessibly mounted upon the top surface of the cabinet.

Obviously, the cabinet could be of various shapes and sizes, and may conveniently be, as illustrated, of a regular rectangular shape, being provided with a front wall 18 having a door or closure 20 therein, a rear wall 22, a top wall 24, a bottom wall 26, which latter has been illustrated as provided with skids or cleats 28 of any suitable material secured therebeneath by means of which the cabinet may be supported. Preferably, although not necessarily, the front, rear, top and bottom walls are formed with a suitable insulating material and of integral construction, it being understood that the front wall is provided with an opening to receive the door or closure 20. The latter may conveniently be mounted as by hinges or the like 30, and may be retained in closed position as by a conventional form of latch or lock 32 provided with a suitable handle for opening and closing the door.

As illustrated in both embodiments of the invention, all of the walls and the door of the cabinet are formed by inner and outer metallic sheets or plates, and are provided with a layer of insulating material therebetween, this being a conventional and known type of refrigerator cabinet construction, and it is not deemed necessary to further detail and describe the same.

However, in the preferred embodiment of Figures 1–3, the cabinet is provided with removable end walls 34 and 36 which are detachably secured to the edges or ends of the top, bottom, front and rear walls of the cabinet as by any suitable detachable connection such as fastening bolts or the like 37. Further, the bottom wall of the cabinet is likewise removable in a similar manner for a purpose which will be later apparent.

It should here be noted that the cabinet 10 may be made in various sizes, depending upon the number of milk cans which it is desired to store in the particular refrigerating cabinet.

In order to increase the size of the cabinet, it is merely necessary to unite two or more units of the type shown in Figure 1, in endwise relation, one of the ends 34 or 36 being removed for this purpose so that the series of cabinets 10 will be disposed in alignment with the ends 34 and 36 secured to the outermost ends of the cabinet assembly to form a unitary storage construction. For this use, a single base unit 26 may be employed if a single cabinet section such as that shown in Figures 1 and 3 is to be provided, while a plurality of base members may be secured beneath each of the cabinet units, or, alternatively, a single unitary but longer base member may be employed to constitute the base for the entire assemblage.

As shown best in Figures 2 and 3, the bottom wall 26 of the cabinet 10 is removably secured to the under surface thereof as by fastening bolts or the like 40 which extend upwardly into the front and rear walls 18 and 22. If desired, of course, similar bolts could be provided for securing the bottom wall 26 to the end walls 34 and 36. In order to establish a satisfactory but detachable sealing engagement between the bottom 26 and the end and side walls of the cabinet, a stepped or shouldered joint is provided therebetween. For this purpose, the lower portion of the end and side walls are shouldered, as at 40, to provide a horizontal stepped surface from the interior surface of the end and side walls to receive a correspondingly shaped and proportioned surface of a shouldered portion 42 of the bottom wall 26. The bottom wall is thus provided with a further horizontal and outwardly extending shoulder 44 which is received beneath and abuts the lower surface of the end and side walls of the cabinet 10, and thus a tortuous shouldered seal is established between the bottom wall and the end and side walls of the cabinet, as will be readily seen from Figures 2 and 3.

As shown in Figure 2, the outer metal sheathing which forms the exterior metal casing of the front wall 18 is integrally extended into the opening receiving the door 20, and is inclined downwardly along the bottom edge of this opening, as at 46. The outer metal casing of the door 20 is at its lower edge likewise downwardly inclined, as at 48, the door being provided with a laterally extending lip portion 50 about its periphery which is adapted to overlie the edges of the opening of the door in the front wall 18, and to have a sealing engagement therewith as by means of a conventional form of rubber gasket or the like 52.

As will be readily apparent from Figure 2, the inner and lower edge of the inclined portion 46 of the outer metal casing of the front wall 18 terminates in a downwardly extending flanged portion 54 which is disposed in spaced parallel relation to the inner metallic sheathing of the cabinet 10. A similar downwardly extending spaced flange 56 is secured in any desired manner to the inner metal casing of the cabinet 10 about the back and end walls of the same to form a continuation of the flange 54.

A combined drip pan, coolant tank or container and the refrigerating coil, container and sump, is received within the lower portion of the interior of the cabinet 10. This tank may conveniently comprise a sheet metal tray having a bottom wall 58, together with side walls 60 about the rim of the bottom wall, these side walls being disposed in spaced relation to the above mentioned metallic interior casing of the cabinet 10 and being provided with upstanding, laterally extending flanges 62 which are intended to underlie the flanges 54 and 56 and thus establish a seal therewith. By this construction, any moisture accumulating on the walls of the interior of the cabinet 10 will drip down over the flanges 54 and 56 and into the interior of the tray or tank, the seal between the flanges 54, 56 and 62 thus preventing the access of moisture into the space between the tank and the bottom of the cabinet.

A support means is provided within the cabinet for supporting milk cans above the drain tray. This supporting means comprises a plurality of horizontally extending angle iron support bars 64, which, at their extremities, rest upon and may be secured to the upper surfaces of channel members or supporting beams 66, these latter resting upon and being supported by the horizontally disposed offset portions 68 of the drain tray. As will be apparent from Figure 3, the spacing between the angle iron members 64 is such as to conveniently receive and support the base of standard milk cans or the like, as indicated at 70. It will thus be seen that the milk cans are supported by a support assembly which is in turn carried by the drain pan, the latter being vertically inserted into and removed from the bottom end of the cabinet 10 by the mere removal of the bottom wall 26 thereof.

Referring now more specifically to Figures 2 and 3, it will be seen that the electric motor 16 which is mounted upon the upper surface of the cabinet 10 has attached thereto a tubular housing 72 which extends downwardly through the interior of the cabinet and terminates within the drain pan, adjacent the lower portion thereof. This housing has detachably secured to its lower extremity a conventional form of fluid pump indicated generally at 74 which has its intake port, not shown, disposed adjacent the bottom of the drain pan, and which has a delivery conduit or pressure line, as shown at 76, which extends upwardly within the compartment of the cabinet. Mounted in any convenient horizontal position within the cabinet 10, as by means of support brackets 78, are a plurality of horizontally disposed manifolds or headers 80 which may comprise or to which may be attached suitable spray nozzle appropriately positioned to encircle the necks of the individual cans 70, whereby coolant inducted into the pump casing 74 from adjacent the bottom of the drain pan will be discharged and sprayed upon the neck portions of the cans 70 in order to cool and chill the same.

It will now be understood that when a suitable coolant such as water or the like is received within the drain tray, the operation of the pump 74 by the electric motor 16 through any suitable electric circuit and control means, not shown, will cause this coolant to be sprayed from the headers or pipes 80 about the neck portions of each of the cans for quickly chilling and cooling the contents of the same, and maintaining the cans at a desired temperature, this coolant then dripping into the drain tank and being recirculated. By this means, cans of fresh and warm milk may be placed within the cabinet and by means of this spray may be quickly brought and chilled to any desired temperature, and thereafter may be maintained at this selected temperature.

As will best be seen by reference to Figures 2 and 3, the motor and compressor refrigerating unit 12 includes, within a suitable exterior casing or housing, a motor compressor unit 82 of any known and conventional construction, which discharges refrigerant, as by means of conduits 84 and 86, to a refrigerating unit 88 having freezing coils 90 disposed therein, this unit being detachably received within the drain pan and being supported on the upper portion of the side walls of the drain pan or tank.

It should be here understood that the refrigerant motor compressor unit, the freezing coil unit, the connecting conduits and all of the necessary accessories pertaining thereto for regulating and adjusting the operation of the refrigerating system to any desired temperature are all of conventional and known design, and in themselves form no part of the present invention, execept as constituting a refrigerating means of any suitable and known type and which forms an element of the improved assembly. However, the control unit 14 is preferably a time clock which controls the pump which sprays the water over the milk cans. This clock may be set for any convenient time such as for one hour, during which time the pump 16 is operated to spray the coolant over the milk cans, this being usually a sufficient time to thoroughly cool the milk in the cans below 50°. The motor compressor refrigerating unit, being of a known and conventional design functions in the customary manner, starting and stopping the compressor in accordance with the amount of ice which has been formed upon the coils, being, in other words, a standard form of ice bank control.

The construction so far illustrated is what may be termed the one unit type, and contemplates a single standard size unit of cabinet. In enlarging the capacity of this cabinet, it is possible either to provide a plurality of additional cabinet units disposed in alignment with each other, and each unit being identical with that previously described except for the elimination of intermediate end walls between the units; or if desired a single large tank or drain pan extending throughout the entire length of the assembly of units could be provided, having a single refrigerant and coolant circulating system associated therewith.

As shown in dotted lines in Figure 3, the bottom wall 26 may be dropped downwardly from the cabinet, whereby the drain pan or tray may be removed downwardly from the cabinet.

In the preferred embodiment previously described, the bottom wall was made removable in order to remove or insert the drip or drain pan vertically through the same. However, it is possible by a slight modification of construction to have this drain pan removable through one of the end walls of the cabinet, and to form the bottom wall as an integral part of the cabinet. Such an embodiment has been illustrated in Figures 4–7. In this construction, similar numerals are provided for similar parts and described the connection with the preferred embodiment. Thus, the numeral 110 designates generally the cabinet unit which is provided upon its exterior surface with a motor compressor unit indicated generally at 112, with a coolant time controlled clock mechanism 114, and a coolant circulating pump 116, all mounted upon the exterior top surface of the cabinet. As in the preceding embodiment, this form of cabinet is provided with front and rear walls 118 and 120, together with an integral front wall 118, having a door 120 therein, and with an integral back wall 122, while integral top and bottom walls 124 and 126 are likewise provided, the latter having cleats 128.

Similarly, the door 120 is provided with hinges 130 and with a latch or lock 132. Removable end walls 134 and 136 are detachably secured to the cabinet 110 as by bolts or other fasteners 137.

The construction of the above mentioned elements are identical in every respect with those of the preceding embodiment of Figures 1–3, except that the bottom wall 126 is integrally formed with the front, rear and top walls of the cabinet.

As in the preceding embodiment, the outer metal casing of the front wall 118 of the cabinet 110 is inclined downwardly and inwardly at the lower edge of the door opening, as at 146, and the outer metal casing of the door 120 is similarly inwardly and downwardly inclined, as at 148. Further, the edge of the door is provided with an overhanging lip portion 150 which is adapted to overlie the door opening and to have a sealing engagement therewith, as by a rubber or other gasket 152.

Similarly to the construction shown in Figure 2, the inclined surface 146 terminates in a depending vertical flange 154 which is parallel to and spaced from the inner metallic casing of the cabinet, and a similar parallel flange 156 is disposed on the interior surface of the rear wall 122. A drain pan is removably received in the interior of the cabinet 110 and is slidable through the removable end walls of the same. This pan, as in the preceding embodiment, includes a horizontal bottom wall 158 together with upstanding side walls 160 which, at their upper ends, terminate in laterally offset portions 162. These offset portions 162 are adapted to underlie the flanges 154 and 156, and to have a sliding sealing engagement therewith, whereby the pan may be withdrawn endwise from the cabinet unit. As in the preceding embodiment, this pan is provided with the angle iron members 164 which in turn rest upon the straps or beams 166 which are supported by the horizontal shoulder portion 168 formed between the two walls 160 and 162 of the drain pan. Conventional milk containers or cans 170 are adapted to be received upon these angle iron members 164 and thus be supported by the drain pan. Likewise, this embodiment of the cabinet is provided with the tubular casing 172 which extends from the coolant motor 116 into the interior of the cabinet and is provided with a coolant circulating pump 174 disposed adjacent the bottom of the drain pan. This pump delivers coolant from the tank from a liquid intake, not shown, up through a discharge conduit 176 and through a discharge manifold or header assembly 180 supported by suitable brackets 178 in the interior of the cabinet 110. As in the preceeding embodiment, from these manifolds or headers, coolant is sprayed about the necks of the cans for cooling the same. The operation of this form of the invention is identical with that previously described, except for the fact that the bottom wall of the cabinet is integral, the drain pan is removed by removing one of the end walls 134 or 136, and sliding the pan endwise therefrom. In order to extend or enlarge this construction of cabinet, it is merely necessary to remove one or both of the end walls, attach suitable cabinet units 110 thereto, each cabinet unit being provided with its own refrigerating unit, coolant circulating system, and drain pan; or, if desired, a single enlarged drain pan, motor compressor unit and coolant circulating system may be utilized.

From the foregoing, it is believed that the principles, and operation and advantages of the invention will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having thus disclosed and described the invention, what is claimed as new is as follows:

1. A milk cooler comprising a cabinet having insulated top, bottom, side and end walls, a door in a side wall, one of said walls being removable, and means for supporting milk cans in said cabinet above said bottom wall for removal through said door, a liquid receiving tank having an open top in said cabinet below said supporting means, said tank being removable through said removable wall, said supporting means resting on the upper edges of said tank.

2. A milk cooler comprising a cabinet having insulated top, bottom, side and end walls, a door in a side wall, one of said walls being removable, and means for supporting milk cans in said cabinet above said bottom wall for removal through said door, a tank, having an open top in said cabinet below said supporting means, said supporting means resting on the upper edges of said tank, means for withdrawing liquid from said tank and spraying said drawn liquid upon cans supported by said support means.

3. A milk cooler comprising a cabinet having insulated top, bottom, side and end walls, a door in a side wall, one of said walls being removable, and means for supporting milk cans in said cabinet above said bottom wall for removal through said door, a tank, having an open top in said cabinet below said supporting means, said supporting means resting on the upper edges of said tank, means for withdrawing liquid from said tank and spraying said drawn liquid upon cans supported by said support means, said last means including a circulating pump motor exteriorly of said cabinet.

4. A milk cooler comprising a cabinet having insulated top, bottom, side and end walls, a door in a side wall, one of said walls being removable, and means for supporting milk cans in said cabinet above said bottom wall for removal through said door, a tank, having an open top in said cabinet below said supporting means, said supporting means resting on the upper edges of said tank, means for withdrawing liquid from said tank and spraying said drawn liquid upon cans supported by said support means, said last means including a liquid spray nozzle in said cabinet positioned for spraying liquid upon the neck of a milk can.

5. A milk cooler comprising a cabinet having insulated top, bottom, side and end walls, a door in a side wall, one of said walls being removable, and means for supporting milk cans in said cabinet above said bottom wall for removal through said door, a liquid receiving tank having an open top in said cabinet below said supporting means, said tank being removable through said removable wall, said supporting means resting on the upper edges of said tank, a refrigerating means for cooling the liquid in said tank.

6. A milk cooler comprising a cabinet having insulated top, bottom, side and end walls, a door in a side wall, one of said walls being removable, and means for supporting milk cans in said cabinet above said bottom wall for removal through said door, a liquid receiving tank having an open top in said cabinet below said supporting means, said tank being removable through said removable wall, said supporting means resting on the upper edges of said tank, a refrigerating means for cooling the liquid in said tank, said refrigerating means including a refrigerating coil disposed in said tank and a refrigerant pump motor disposed exteriorly of said cabinet.

7. A milk cooler comprising a cabinet having insulated top, bottom, side and end walls, a door in a side wall, one of said walls being removable, and means for supporting milk cans in said cabinet above said bottom wall for removal through said door, a liquid receiving tank in said cabinet below said supporting means, said tank being removable through said removable wall, said tank having vertical side walls provided with a laterally and outwardly extending offset at their upper ends, the side and end walls of said cabinet having a depending portion received in said offset.

8. A milk cooler comprising a cabinet having insulated top, bottom, side and end walls, a door in a side wall, one of said walls being removable, and means for supporting milk cans in said cabinet above said bottom wall for removal through said door, a liquid receiving tank in said cabinet below said supporting means, said tank being removable through said removable wall, said tank having vertical side walls provided with a laterally and outwardly extending offset at their upper ends, the side and end walls of said cabinet having a depending portion received in said offset, said supporting means being mounted on said offset.

9. A milk cooler comprising a cabinet having insulated top, bottom, side and end walls, a door in a side wall, one of said walls being removable, and means for supporting milk cans in said cabinet above said bottom wall for removal through said door, a liquid receiving tank in said cabinet below said supporting means, said tank being removable through said removable wall, said tank having vertical side walls provided with a laterally and outwardly extending offset at their upper ends, the side and end walls of said cabinet having a depending portion received in said offset, said side wall having the door being provided with a door sill having a surface sloping downwardly towards the interior of said cabinet, said surface having a depending portion received in said offset.

RICHARD MARKLEY.

References Cited in the file of this patent

UNITED STATES PATENTS

| Number | Name | Date |
|---|---|---|
| 2,256,971 | Chamberlain | Sept. 23, 1941 |
| 2,279,945 | Hoffman | Apr. 14, 1942 |
| 2,411,833 | McMahon | Nov. 26, 1946 |
| 2,455,162 | Donnelly | Nov. 30, 1948 |
| 2,479,011 | Kemper | Aug. 16, 1949 |
| 2,482,579 | Duncan | Sept. 20, 1949 |